United States Patent [19]

Belter

[11] Patent Number: 5,791,660

[45] Date of Patent: *Aug. 11, 1998

[54] METAL GASKET WITH BOLT RETENTION FEATURE

[75] Inventor: Jerome G. Belter, Mt. Prospect, Ill.

[73] Assignee: Dana Corporation, Toledo, Ohio

[*] Notice: The term of this patent shall not extend beyond the expiration date of Pat. No. 5,544,902.

[21] Appl. No.: 642,031

[22] Filed: May 2, 1996

Related U.S. Application Data

[63] Continuation of Ser. No. 268,413, Jun. 30, 1994, Pat. No. 5,544,902.

[51] Int. Cl.$^6$ ........................................... F16J 15/32
[52] U.S. Cl. ................................... 277/598; 277/630
[58] Field of Search ......................... 277/9.5, 11, 189, 277/235 R, 236, 9, 235 B

[56] References Cited

U.S. PATENT DOCUMENTS

| | | |
|---|---|---|
| 2,439,306 | 4/1948 | Laidley . |
| 2,639,832 | 5/1953 | Bergstrom .................. 277/189 |
| 3,472,303 | 10/1969 | Beard ........................... 151/69 |
| 3,948,532 | 4/1976 | Hopp ............................ 277/11 |
| 4,648,607 | 3/1987 | Yamada et al. ............ 277/235 B |
| 4,693,248 | 9/1987 | Failla ........................... 128/334 |
| 4,756,561 | 7/1988 | Kawata et al. ............ 277/235 B |
| 4,784,396 | 11/1988 | Scott et al. ................ 277/235 B |
| 4,819,054 | 4/1989 | Fucci et al. ............... 277/235 B |
| 5,083,801 | 1/1992 | Okano et al. ................. 277/11 |
| 5,096,325 | 3/1992 | Udagawa .................. 277/235 B |
| 5,259,629 | 11/1993 | Udagawa ..................... 277/235 |
| 5,544,902 | 8/1996 | Belter ........................... 277/236 |

*Primary Examiner*—Daniel G. DePumpo
*Attorney, Agent, or Firm*—Rader, Fishman & Grauer PLLC

[57] ABSTRACT

A metal gasket is utilized for sealing two metal surfaces clamped together by a pair of bolts. A first metal plate has at least two apertures for receiving the bolts. The bolts have a major thread diameter and a minor thread diameter. At least one of the apertures has a first inner diameter larger than the major diameter with a plurality of retainer tabs extending radially inwardly to define a second inner diameter larger than the minor thread diameter and smaller than the major thread diameter.

7 Claims, 2 Drawing Sheets

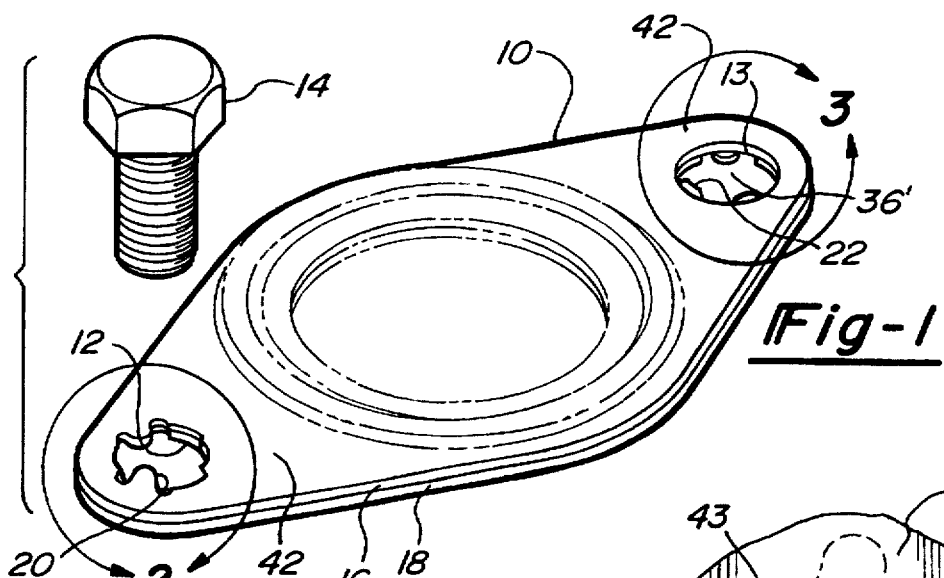
Fig-1
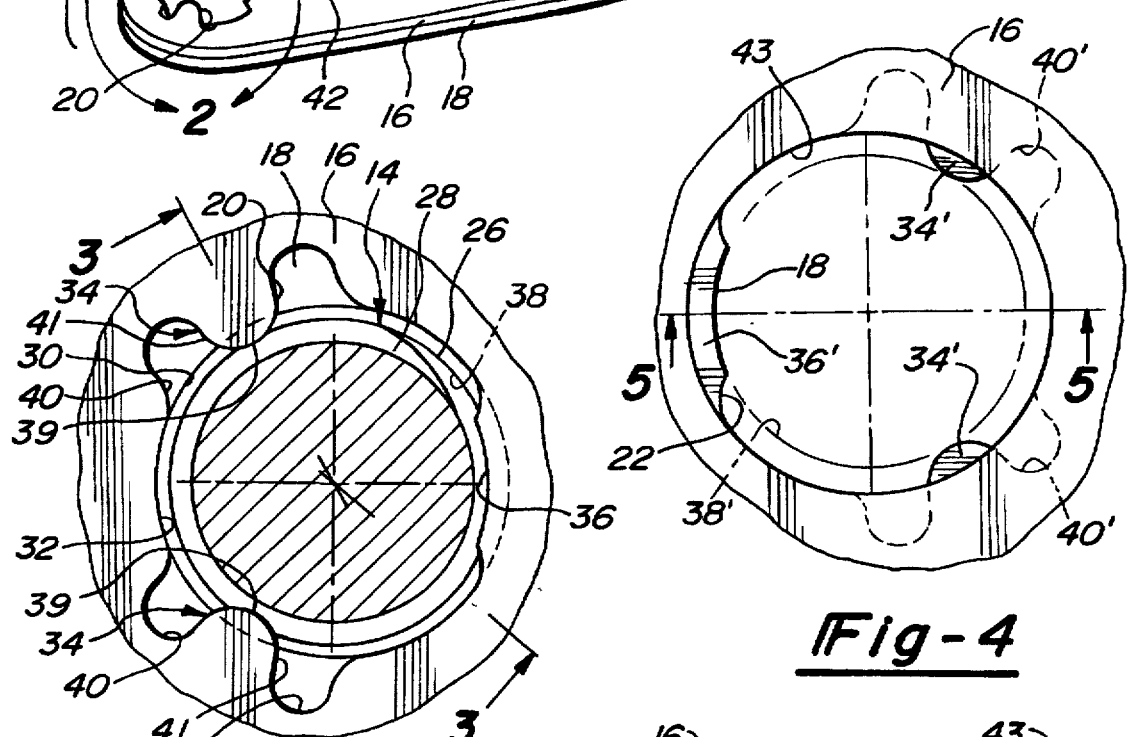
Fig-2
Fig-4
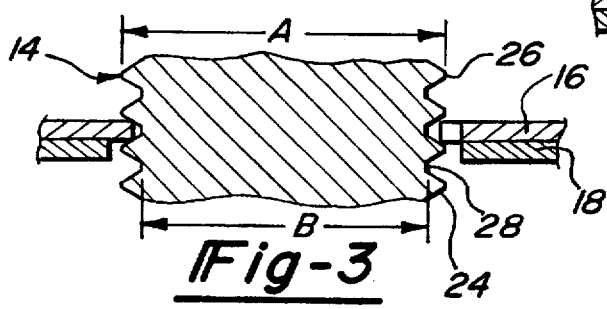
Fig-3
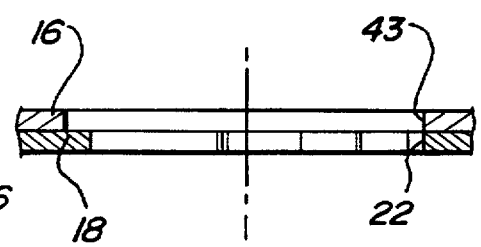
Fig-5

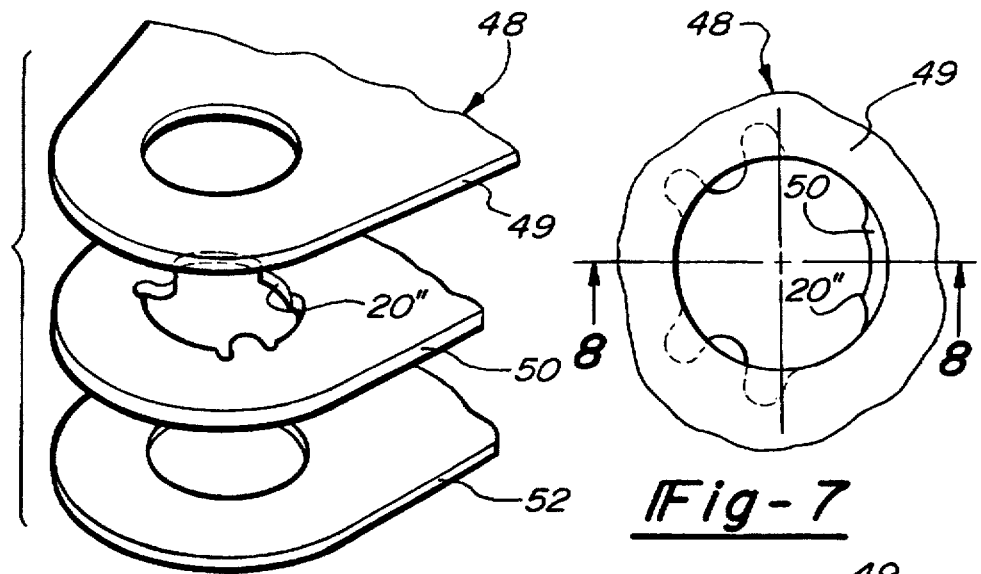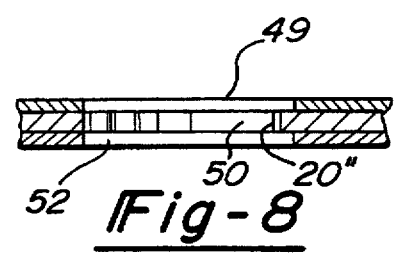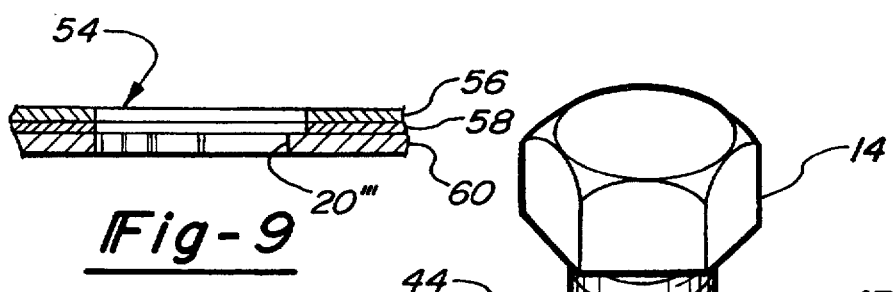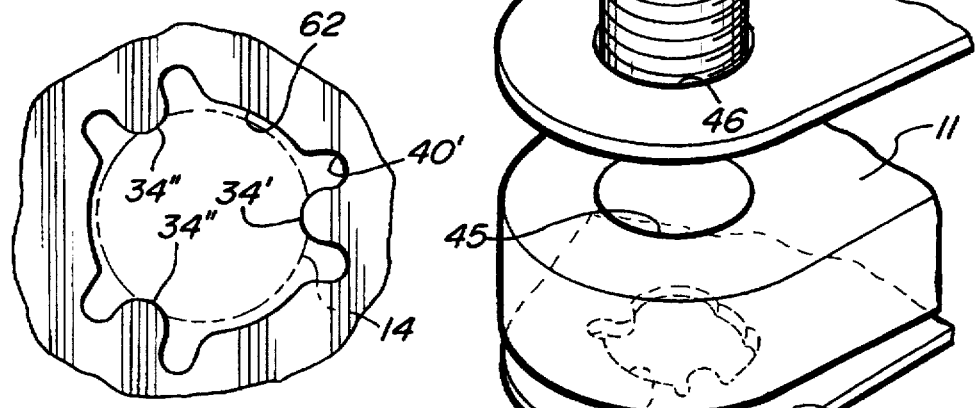

METAL GASKET WITH BOLT RETENTION FEATURE

This is a continuation of application Ser. No. 08/268,413 filed on Jun. 30,1994 Pat. No. 5,544,902.

FIELD OF THE INVENTION

The present invention relates to improvements in metal gaskets.

BACKGROUND OF THE INVENTION

Metal gaskets are often used as seals between mating metal surfaces. One common application involves gasket placement between a head and an exhaust manifold of an internal combustion engine. Another application involves gasket placement between the exhaust manifold and an exhaust pipe flange. Gaskets in either location can be described as exhaust manifold gaskets. The gasket between the engine head and the exhaust manifold surrounds exhaust ports in the engine block to provide an exhaust seal. Similarly, the gasket between the exhaust manifold and the exhaust pipe flange surrounds the opening of the exhaust manifold to provide an exhaust seal. Both exhaust manifold gaskets prevent hot combustion products exiting the engine from escaping into the engine compartment of the vehicle.

Exhaust manifold gaskets are typically installed by aligning bolt holes or apertures in the gasket with corresponding holes in the exhaust manifold. The exhaust manifold and gasket are then aligned with corresponding threaded apertures in the cylinder head. A first bolt is then threaded into the engine cylinder head. Bolts are then passed through the remaining apertures. Some maneuvering of the manifold and gasket relative to the engine cylinder head may be required to align the holes therein with the corresponding threaded apertures of the engine cylinder head before the bolts can be inserted.

Similarly, the exhaust gasket between the manifold and the exhaust pipe flange are assembled with a bolt passing through the aperture of the exhaust manifold and a corresponding aperture of the gasket and threading into the exhaust pipe flange, a weld nut fixed to the flange, or a nut disposed beneath the flange, or stud and nut assembly.

There are several difficulties in such an assembly process. For example, the gasket may slip from its desired position, or drop off the end of the inserted bolt or stud altogether, before it can be fixed in place between the exhaust manifold and its mating surface. It would be highly desirable to have a gasket that will not fall off the threaded ends of the bolts after bolts have been passed through bolt holes in the gasket. Thus, an assembler could maintain the gasket in place relative to the manifold when mating the manifold to both the engine head and the exhaust pipe flange.

Several methods exist for capturing the threaded ends of screws, but none are well suited for use with exhaust manifold gaskets. One approach for retaining bolts is to provide a star shaped opening defining inwardly directed fingers in soft gasket material. Pushing a bolt through the gasket opening causes the fingers open outward in the direction of motion of the bolt, partially covering the bolt. The gasket material around the bolt is compressed when the gasket is subsequently clamped, with the material on the side of the bolt providing a seal around the bolt. Use of this configuration with a steel gasket would be problematic because the high bending strength of steel would resist insertion of the bolt and the resultant axially extending fingers would prevent the mating surfaces from being drawn together to form the desired seal.

Retention means in gaskets have also been employed to fix the gasket over locating pins as is done with head gaskets. An aperture in the gasket has radially extending fingers which engage the pin. As the gasket is pushed down over the pin, the fingers deflect upward, locking the gasket to the pins at the aperture. The fingers act as a unidirectional brake, resisting efforts to subsequently lift the gasket from the pin. One problem with this approach as applied to threaded fasteners is that with the fingers so engaging the fastener, the torque to turn the bolt would be undesirably increased. Another problem is that such a retention means may damage the threads of the fastener.

In short, there is no affirmative teaching in the prior art of how to retain a metal gasket on a threaded bolt passing through an exhaust manifold.

SUMMARY OF THE INVENTION

A disclosed exhaust manifold gasket for an internal combustion engine includes at least one metal plate. The plate has at least one and preferably two apertures for receiving threaded fasteners. The threaded fasteners have a major thread diameter or crest and a minor thread diameter or root. At least one of the gasket apertures has an irregular shape defined in part by a first inner diameter larger than the major thread diameter. A plurality of retainer tabs extend inward from the first inner diameter to define a second inner diameter larger than the minor thread diameter and smaller than the major thread diameter. There is a circumferential gap between at least two of the tabs sufficiently large to accommodate entry of a thread tooth for threading of the threaded fastener into or out of the aperture.

The resultant gasket is one in which threaded fasteners, or bolts, can engage the bolt holes by either being pushed through them with the tabs elastically deflecting and subsequently being axially captured between threads, or by threading the bolt into the aperture to axially capture the bolt. Such a gasket can be retained in a desired mounting position on a manifold or the like, retaining bolts in their desired position, as part of a gasket-manifold sub-assembly, facilitating the mounting of both the manifold to the engine and the exhaust pipe to the manifold. Specifically, such a gasket offers the advantage of a simplified installation of gaskets between two surfaces.

The gasket of the present invention facilitates assembly of a heat shield, a manifold, a gasket, and the bolts into a manifold module which is easily mounted to an engine. Apertures in the heat shield, manifold, and gasket are aligned and bolts passed therethrough from the heat shield side. Engagement between the bolts and the gasket holds the module together.

The objects of the present invention can be best understood from the following specification and drawings of which the following is a brief description.

BRIEF DESCRIPTION OF THE DRAWINGS

FIG. 1 is a perspective view of a gasket exhibiting a first embodiment of the present invention with a bolt aligned with an aperture therein for engagement therewith.

FIG. 2 is a planar view of a portion of FIG. 1 in circle 2 showing a section bolt disposed in the aperture.

FIG. 3 is a cross-sectional view of the present invention in the direction of arrows 3 of FIG. 2.

FIG. 4 is a planar view of a portion of FIG. 1 in circle 4 showing a second aperture thereof.

FIG. 5 is a cross-sectional view in the direction of arrows 5 of FIG. 4.

FIG. 6 is an exploded view of a broken out portion of a first alternative embodiment of the present invention.

FIG. 7 is a planar view of an aperture of the first alternative embodiment of the present invention.

FIG. 8 is a cross-sectional view of the first alternative embodiment of the present invention in the direction of arrows 8 of FIG. 7.

FIG. 9 is a cross-sectional view through an aperture of a second alternative embodiment of the present invention.

FIG. 10 is a planar view of a third alternative embodiment of the present invention.

FIG. 11 is an exploded perspective view of a flange area of a manifold module employing the present invention.

DESCRIPTION OF A DETAILED EMBODIMENT

An exhaust manifold gasket 10 shown in FIGS. 1-11 is configured for placement between an exhaust manifold flange 11 and a flange of an exhaust pipe (not shown). However, the inventive feature of this invention, relating to apertures 12 and 13 adapted to receive bolts 14, which are one preferred form of a threaded fastener, is applicable to any metal gasket where it is useful to provide engagement between a bolt 14 and the gasket 10. In particular, metal gaskets disposed between the exhaust manifold and the engine would be benefited by the employment of such apertures 12.

The gasket 10 of FIG. 1 is of steel laminate construction, with first and second layers, or plates, 16 and 18 respectively. It is readily apparent in FIG. 1 that the first aperture 12 has an irregularly shaped opening 20 formed in the first plate 16 and the second aperture 13 has an irregularly shaped opening 22 formed in the second plate 18. These irregularly shaped openings 20, 22 are configured to engage thread teeth 24 of the bolt 14.

The bolt 14, as illustrated in greater detail in FIG. 3, has a major diameter A across crests 26 of the thread teeth 24 and a minor diameter B across roots 28 of the thread teeth 24. A constant diameter opening 30 in the second plate 18 larger than the major diameter A defines that portion of the aperture 12 passing through the second plate 18. The irregularly shaped opening 20 in the first plate 16, more clearly shown in FIG. 2, is in part defined by a first inner diameter 32 equal in diameter and aligned with the constant diameter opening 30 in the second plate 18, and has a plurality of tabs 34, 36 extending radially inward. In a preferred embodiment, there are two of tabs 34 and at least one of tabs 36. The tabs 34, 36, define a second inner diameter 38 larger than minor diameter B and smaller than major diameter A.

The three tabs 34, 36 are preferably evenly distributed about the opening 20, separated at their centers by 120°. The even distribution of tabs 34, 36 aids in keeping the bolt 14 approximately centered in the aperture 12 as well as evenly distributing a bolt retaining load between the individual tabs 34, 36. Tabs 34 are radially elongated due to scallaps 40, relative to tab 36 which is comparatively short. Tabs 34 have a tip 39 extending radially inward from the first inner diameter 32 to the second inner diameter 38. Relief scallops 40 are cut radially outwardly from the first inner diameter 32 into the plate 16 adjacent the tips 39 of the tabs 34, defining sides 41 of the tabs 34. The sides 41, as formed by the scallops 40, help provide a tapered profile which becomes broader further from the tips 39, thereby reducing bending stress in the tabs 34. Therefore, the resultant elongated tabs 34 are able to sustain an appreciable amount of deflection at the tips 39. The third or short tab 36 extends radially inwardly directly from the first inner diameter 32 to the second inner diameter 38 like the tips of tabs 34, but without adjacent scallops 40. The third tab 36 is also wider, having a greater circumferential extent than the elongated tabs 34. The result is that the third tab 36 is much more resistant to bending than the elongated tabs 34 providing even greater retention of the bolt 14 within the aperture 12. In one preferred embodiment, a distance across the opening 12 from the short tab 36 to the opposed first inner diameter 32 is greater than the major diameter A, allowing the bolt 14 to be pushed through the aperture 12 with only the elongated tabs 34 appreciably deflecting. This prevents the short tab 34 from plastically deflecting.

The first plate 16, and the second plate 18 are joined to each other by at least two spot welds 42 located proximate to the apertures 12 and 13. The irregularly shaped opening 22 in the second plate 18 is aligned with a constant diameter opening 43 in the first plate 16 as illustrated in FIG. 4. The irregularly shaped opening 22 in the second plate 18 is essentially a mirror image of the irregularly shaped opening 20 in the first plate 16. Here too there are three tabs 34' and 36' defining a second inner diameter 38' of the second plate. Two of the tabs 34' have scallops 40' defining the tabs 34' with the third tab 36' being without such scallops 40' and being wider than the first tabs 34'. A first inner diameter 32' of the irregularly shaped opening 22 is equal to and aligned with the constant diameter opening 43 in the first plate 16. FIG. 5 illustrates the overlap between the openings 22 and 43.

As shown in FIG. 11, one method of assembly of a manifold module 44 employing an exhaust manifold gasket 10 begins with aligning apertures 12, 45, 46 in the gasket 10, a manifold flange 11, and optionally, a heat shield 47, respectively. The bolt 14 is then aligned with the apertures 12, 45, 46 on the shield side as in FIG. 11 and pressed into the first aperture 12. The gasket 10 must be backed up with a tool (not shown) to avoid distortion during insertion. When the bolt 14 is forced into the first aperture 12, the tabs, particularly the elongated tabs 34 deflect axially, allowing the bolt to enter the opening. The crest 26 of each tooth 24 deflects the tabs 34, 36 with the tabs then springing back into the subsequent roots 28 of the teeth. The amount of force required to force the bolt 14 into the opening depends upon a large number of factors including the circumferential extent of the tabs, the type and thickness of the plate 16 in which the tabs 34, 36 are formed, the length of the tabs, the number of tabs, whether the plate is on the bottom or the top of the laminate, and the direction from which the bolt 14 enters the aperture 12. These same factors also affect the amount of force the gasket will sustain before the bolt 14 will be pulled out. For the application for which this embodiment is intended to be used, a minimum of three tabs 34, 36 are necessary to sustain the anticipated retaining loads on the gasket 10 to bolt 14 interfaces. Because the second inner diameter 38 is larger than the minor diameter B, and because there is a generous amount of space between the tabs 34, 36 in the circumferential direction, the bolt 14 can be threaded into and out of the aperture 12 with substantially no torsional resistance. Mounting of an assembled manifold module 44 to the engine head or of an exhaust pipe to the module is completed by aligning the parts and using a multi-head spindle to tighten the bolts.

FIG. 6 illustrates a first alternative construction or embodiment forming a three layer metal laminate 48, with top 49, middle 50 and bottom 52 layers and an irregularly shaped opening 20" in the middle layer 50. FIG. 7 illustrates a planar view of such a configuration.

FIG. 8 illustrates a sectional view of the first alternative embodiment in which the top and bottom layers, 49, 52 are thin relative to the middle layer 50 with the irregularly shaped opening 20'. The top and bottom layers 49, 52 are formed of stainless steel. The middle layer 50 is formed of aluminized steel.

FIG. 9 illustrates a second embodiment of a gasket 54 employing a three layer steel laminate structure with stainless steel top and middle layers, 58, 60 and an aluminized steel bottom layer 60 in which is formed an irregularly shaped opening 20'".

FIG. 10 illustrates a third alternative embodiment with an alternative configuration of an irregularly shaped opening 62. In this embodiment, all of the tabs 34" are of the elongated variety.

Preferred embodiments of the present invention have been disclosed. A worker of ordinary skill in the art would realize, however, that certain modifications would come within the teaching of this invention. For example, it may be desirable to provide tabs without scallops, making the tabs more resistant to deflection. Likewise, it may be preferred for a particular application to provide scallops for just one tab, thereby arriving at an intermediate stiffness or resistance to bolt insertion as a hole. The following claims should be studied in order to determine the true scope and content of the invention.

I claim:

1. A high temperature gasket assembly for sealing two metal surfaces, the gasket assembly comprising:

a fastening means comprising major and minor diameters; and a metal plate adapted to be disposed between the metal surfaces, the plate having at least one aperture for receiving the fastening means, the aperture having a first inner diameter larger than the major diameter and a plurality of tabs extending radially inwardly and defining a second inner diameter larger than the minor diameter and smaller than the major diameter, with at least a first tab having a tip extending from the first inner diameter to the second inner diameter and having sides defined in part by adjacent scalloped portions, a circumferential gap between at least two of the tabs sufficiently large to accommodate movement of the fastening means into and out of the aperture, wherein a second tab extends a greater circumferential extent than the first tab, and extends radially between the first inner diameter and the second inner diameter, the second tab providing additional stiffness against removal of the fastening means from the aperture.

2. A gasket assembly as recited in claim 1, wherein the aperture has three tabs.

3. A gasket assembly as recited in claim 1, wherein the tabs are spaced approximately evenly circumferentially about the inner diameter.

4. A gasket assembly as recited in claim 1, wherein at least one of the tabs deflects responsive to the fastener being pushed thereagainst.

5. A gasket assembly as recited in claim 1, wherein at least three tabs spaced approximately evenly about the first inner diameter deflect responsive to the fastening means being pushed thereagainst.

6. A metal plate for use in a high temperature gasket assembly for sealing two metal surfaces comprising:

at least one aperture having a first inner diameter and a second inner diameter with first and second tabs extending from the first inner diameter and terminating at the second inner diameter, a circumferential gap existing between at least two of the tabs, wherein the second tab extends a greater circumferential extent than the first tab.

7. A high temperature gasket assembly for sealing two metal surfaces, the gasket assembly comprising:

a fastening means comprising major and minor diameters; and a metal plate adapted to be disposed between the metal surfaces, the plate having at least one aperture for receiving the fastening means, the aperture having a first inner diameter larger than the major diameter and a plurality of tabs extending radially inwardly and defining a second inner diameter larger than the minor diameter and smaller than the major diameter, with at least a first tab having a tip extending from the first inner diameter to the second inner diameter and having sides defined in part by adjacent scalloped portions, a circumferential gap between at least two of the tabs sufficiently large to accommodate movement of the fastening means into and out of the aperture, wherein a second metal plate is joined to the first metal plate with the second metal plate having an aperture equal in size to the first inner diameter and a line concentrically therewith.

* * * * *